July 5, 1949.                J. J. SLOMER                 2,475,260
                         FLUID OPERATED CONTROLLER
Filed Oct. 10, 1947                                    4 Sheets-Sheet 1
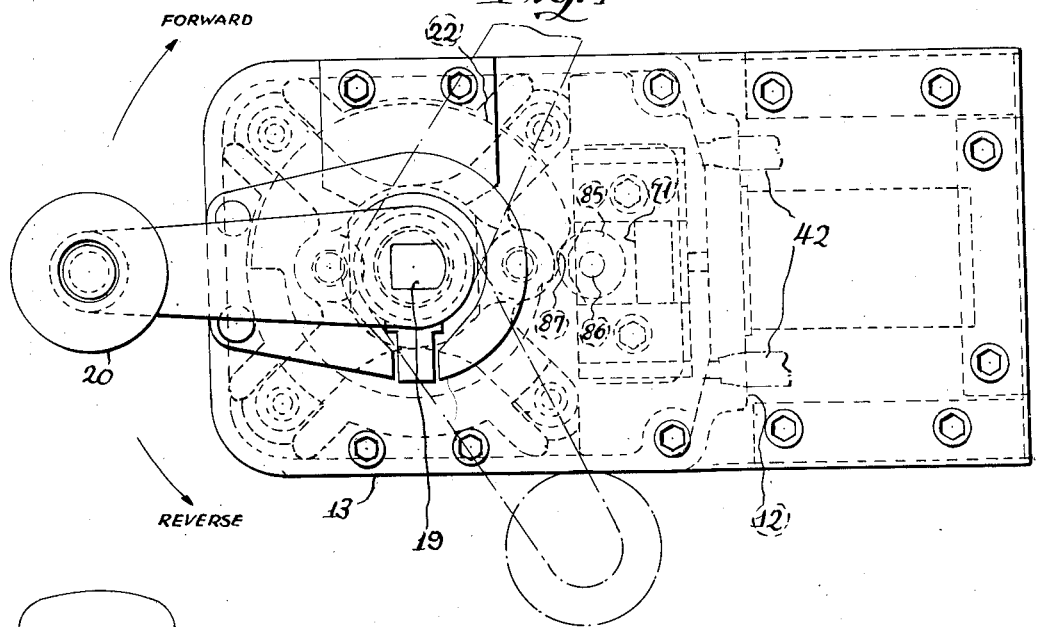
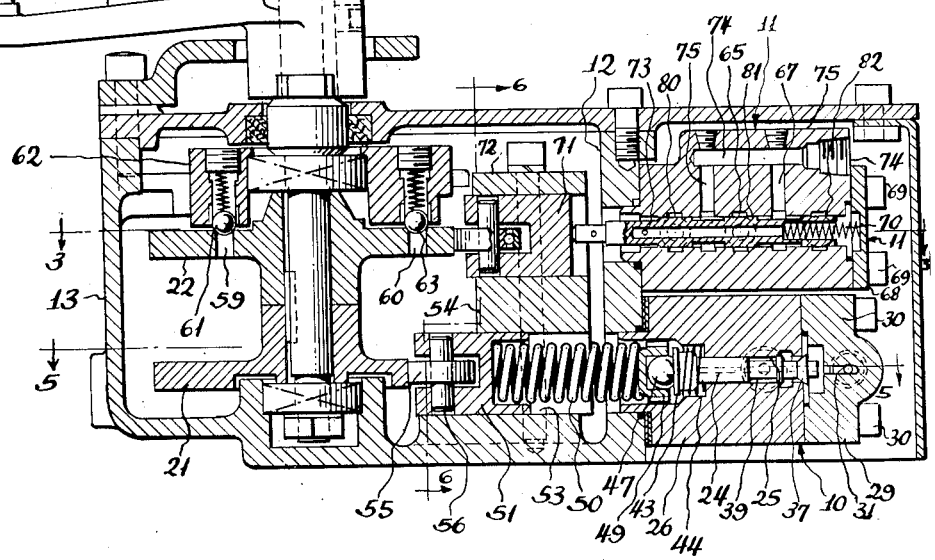
INVENTOR
Joseph J. Slomer
Clarence F. Poole
Attorney INVENTOR
Joseph J. Slomer
Clarence F. Poole
Attorney July 5, 1949. J. J. SLOMER 2,475,260
FLUID OPERATED CONTROLLER
Filed Oct. 10, 1947 4 Sheets-Sheet 4

INVENTOR
Joseph J. Slomer
BY
Clarence F. Poole
Attorney

Patented July 5, 1949

2,475,260

UNITED STATES PATENT OFFICE 2,475,260

FLUID OPERATED CONTROLLER

Joseph J. Slomer, Chicago, Ill., assignor to Goodman Manufacturing Company, Chicago, Ill., a corporation of Illinois Application October 10, 1947, Serial No. 779,160

4 Claims. (Cl. 318—553)

This invention relates to improvements in fluid operated controllers particularly adapted to control the operation of the motors used to propel mine locomotives.

The principal object of my invention is to provide a new and improved fluid operated controller for the motors of a locomotive which is of a novel and efficient construction and includes valve means for starting and reversing the motors and a single control handle for said valve means, so arranged as to determine the direction of travel of the locomotive by the direction of movement of the control handle.

A more specific object of my invention is to provide a novel and efficient form of fluid operated controller for controlling operation of a plurality of motors used to propel mine locomotives and including a variable pressure control valve and fluid operated reversing devices for the motors, together with a single control handle for controlling operation of the variable pressure control valve and reversing devices, and so arranged that as the control handle is turned in one direction from a neutral position the locomotive will travel in one direction and when it is turned in an opposite direction from a neutral position the direction of travel of the locomotive will be reversed, together with fluid control connections from the reversing devices to the variable pressure control valve, so arranged that fluid can only be supplied to the variable pressure control valve to operate the locomotive, when the reversing devices are in forward or reverse positions.

These and other objects of my invention will appear from time to time as the following specification proceeds and with reference to the accompanying drawings wherein:

Figure 1 is a plan view of the control means of a fluid operated controller constructed in accordance with my invention;

Figure 2 is a longitudinal sectional view taken through Figure 1, showing certain details of the reversing valve and variable pressure control valve and the operating means therefor;

Figure 3:
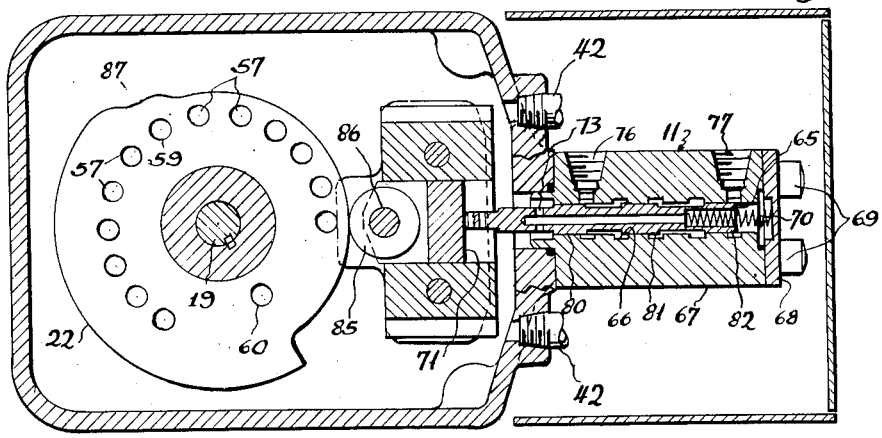
Figure 3 is a fragmentary horizontal sectional view taken substantially along line 3—3 of Figure 2, showing the reversing valve in one operative position.

In the embodiment of my invention illustrated in the drawings, the hydraulic controller includes generally a variable pressure control valve 10 and a reversing valve 11 mounted on an outside wall 12 of a casing 13 and extending within said casing. It also includes hydraulic reversing devices 14, 14 consisting of cylinders 15, 15 having pistons 16, 16 movable therein for operating reverse drums 17, 17 for reversing the direction of operation of the locomotive motors (not shown), and distributor valves 18, 18 for supplying fluid under pressure to the operating cylinders (not shown) for the locomotive contactors (not shown) in a predetermined order, for starting and accelerating the locomotive motors, as in my prior Patent No. 2,417,524, dated March 18, 1947, and no part of my present invention, so not herein shown or described in detail.

A vertical shaft 19 is journaled within the casing 13 and extends upwardly through the cover for said casing, and has a control handle 20 mounted on its upper end, for turning said shaft and controlling operation of the valves 10 and 11, by means of two cams 21 and 22, keyed on said shaft. The cam 21 serves to operate said variable pressure control valve and the cam 22 serves to operate said reversing valve, as will hereinafter more clearly appear as this specification proceeds.

The variable pressure control valve 10 includes a valve piston 24 slidably movable in a valve chamber 25 formed in a block 26 for said valve. The valve chamber 25 opens to each end of said block and communicates with an enlarged chamber 27 formed in a cap piece 29, closing the outer end of said valve block and secured thereto as by cap screws 30, 30. The chamber 27 communicates with a variable pressure passageway 31 leading from said cap piece and connected with an overload relay 32 by a pipe 33 (see Figure 11). Said overload relay is a hydraulic type of relay similar to that shown and described in my Patent No. 2,417,524 and is no part of my present invention so is not herein shown or described in detail. A pipe 34 is connected from said overload relay to the head ends of the distributor valves 18, 18 for supplying variable pressures thereto to successively open certain ports in said valves (not shown) as the pressure in the pipe 34 progressively increases, and to permit said ports to close as said pressure progressively decreases. Said distributor valves and the control means operated thereby for controlling operation of the motors are similar to those shown in my prior Patent No. 2,417,524, and are no part of my present invention so are not herein shown or described.

Figure 11:
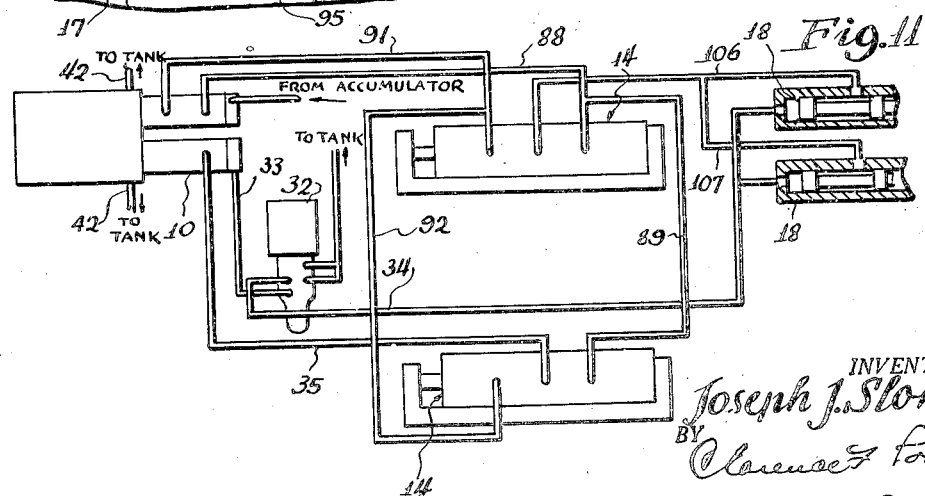
Figure 11 is a fragmentary diagrammatic view illustrating certain parts of the fluid diagram for controlling operation of the locomotive motors.

In Figure 11 a portion of a fluid circuit for controlling operation of a two motor locomotive is shown, and two reversing devices 14 and reverse drums 17 and two distributor valves 18 are herein shown as being provided for operating the locomotive. One of said reversing devices, reverse drums and distributor valves and the hydraulically operated contactors operated thereby, for controlling operation of one locomotive motor, may be mounted on the casing for each locomotive motor, so the wiring for the locomotive may be connected directly to the motor casings with no intermediate connections between the controllers and motor casings.

Fluid under a constant pressure is conducted to the valve block 26 by means of a pipe 35. Said pipe is connected from one reversing cylinder 15, intermediate its ends, to said valve block and communicates with a pressure passageway 36 extending within said valve block and leading to the valve chamber 25. The valve piston 24 has a substantially frusto-conical outer portion disposed outside of said valve chamber 25 and engaging the inner periphery of said valve chamber 25 at the outside of said valve block. Said inner periphery of said valve chamber forms a seat for said frusto-conical portion of said valve piston, which forms a poppet valve 37, for admitting fluid to the chamber 27 at varying pressures determined by the position of the control handle 20. The valve piston 24 has a reduced portion 39 extending on opposite sides of the pressure passageway 36. A land 40 forms the right-hand wall of said reduced portion and forms a piston valve to release fluid to the poppet valve 37 and variable pressure chamber 27, upon movement of said valve piston to the right.

The valve piston 24 is drilled throughout its length and opens to the hollow inside of the casing 13, to permit the release of fluid from the variable pressure line 31 through said valve piston into said casing, and out said casing to the return through either one of two return lines 42, 42. The end of the valve piston 24 opposite from the poppet valve 37 has a collar 43 threaded thereon. Said collar is shouldered to form a seat for a spring 44 interposed between said shouldered portion of said collar and a shoulder portion 45 of the valve chamber 25 to tend to move said piston valve to the left into position to close said piston and poppet valves. A ball 47 is seated in the collar 43 and forms a valve to close the drilled passageway through said valve. Said ball is also seated in the recessed end of a member 49, the opposite end of which member forms a seat for a compression spring 50. Said spring serves to operate the valve piston 24 and also serves to hold said ball on its seat formed by the inner periphery of the collar 43, to prevent the discharge of fluid through the hollow inside of said valve piston into the casing 13. When said spring 50, however, is free, fluid under pressure may be discharged past said ball into said casing. The end of said compression spring opposite from said member 49 is seated within a rectangular block 51 slidably guided in a rectangular guide 53 formed in a guide member 54 secured to the bottom of the casing 13 and extending upwardly therefrom. A roller 55 is journaled in the opposite end of the block 51 from the spring 50 on a vertical pin 56. Said roller is adapted to engage the face of the cam 21, for moving said block 51 along the guide 53 to displace the spring 50 to the right, upon turning movement of said cam.

The cam 21 is of a substantially heart-shaped formation with the off position of the variable pressure valve being at its low or recessed portion, and the extreme on position, when the control handle 20 is turned in either direction, being at its apex. When said cam is in an off position, the spring 50 will be free and fluid will be released from the variable pressure line 31 through the center of the valve piston 24 and past the ball 47. Turning of said control handle in either a clockwise or counterclockwise direction from this off position, displaces said spring towards the valve block to move the valve piston 24 to the right and permit fluid to pass by the land 40 and poppet valve 37 into the chamber 27 and passageway 31, to supply fluid to the distributor valves 18, 18 at progressively increasing pressures. As said cam is turned to its off position, the spring 50 will be displaced to the left to progressively reduce the pressures in said variable control pipe and release fluid from said pipe past the ball 47.

The cam 22, disposed above the cam 21, is provided with a plurality of indexing holes 57, 57 drilled therethrough at definitely spaced intervals at opposite sides of an indexing hole 59, indicating the off position of the valves 10 and 11. Another indexing hole 60 is drilled 180° from the hole 59 and is spaced inwardly therefrom, to more positively hold said cams in the off position. Said indexing holes 57 and 59 are adapted to be yieldably engaged by a spring pressed ball 61, mounted in a support member 62 for the upper bearing for the shaft 19. Said indexing hole 60 is adapted to be engaged by a spring pressed ball 63 carried by said support member (see Figure 2).

When the control handle 20 is turned to the first operating position, either to the right or left of the neutral indexing hole 59, the spring 50 will be displaced an amount equal to the travel of the block 51 minus any clearance there might be between the end of the spring and the seat 49 and any clearance there might be between the ball 47 and the collar 43. Fluid under pressure will then pass by the land 40 and the poppet valve 37 into the chamber 27 and the variable pressure pipe 31, at a pressure substantially equal to the force exerted by the spring 50. As pressure in the variable pressure line 31 tends to increase beyond the force exerted by the spring 50, the valve piston 24 will be moved to the left and the ball 47 will also be moved to the left against the spring 50, to release fluid from the end of said valve into the hollow casing 13. As pressure against the right-hand end of said valve piston and said ball 47 is reduced, said spring 50 will again move said valve piston to the right to hold fluid pressure in said variable pressure line. As pressure in said variable pressure line is reduced a further amount, said spring will move said valve piston to the right a distance sufficient to open the valve formed by the land 40 and the poppet valve 37 and admit fluid under pressure to said variable pressure line.

It should here be understood that in order to maintain the desired pressure in the pressure line 31 and to take care of any leakages of fluid, the ball 47 is continually being unseated to release fluid from said variable pressure line and the valve piston 24 is continually moving back and forth in the valve chamber 25, to hold pressure in said variable pressure control line and admit fluid under pressure to said line or to discharge fluid past the ball 47 to the hollow inside of the casing 12 and to the return.

As the control handle 20 is turned towards an off position, the displacement of the spring 50 will be decreased for each step of turning movement of said control handle, and fluid pressure exerted against the right-hand end of the valve piston 24 and the ball 47 will move said valve piston to the left and will unseat said ball. Fluid will then be discharged past said ball through the hollow inside of the casing 13 to the return, until said valve piston has been balanced and the desired pressure has been established in the variable pressure line 31, for the corresponding position of the control handle 20.

The reversing valve 11 includes a valve piston 65 movable in a valve chamber 66 formed in a valve block 67 secured to the end wall 11 of the casing 13 and projecting outwardly therefrom. Said valve chamber opens to each end of said valve block and the outer end thereof is closed by a cap piece 68 secured thereto by cap screws 69, 69. A compression spring 70 engages the inside of said cap piece and extends within a hollow inside portion of said valve piston, to urge said valve piston to the left. The end of said valve piston opposite from said spring engages a block 71 slidably movable in a guide member 72, disposed above and secured to the guide member 54. Said valve piston is drilled from its right-hand end for a portion of its length and the drilled portion thereof communicates with a cross drill 73, to release fluid to the inside of the hollow valve casing 13, where it is returned to the tank through the pipes 42, 42. A pressure passageway 74 enters said valve casing adjacent the upper end thereof and extends longitudinally therealong and communicates with two longitudinally spaced pressure passageways 75, 75 extending at right angles to said pressure passageway 74 and leading to the valve chamber 66. A pressure passageway 76 is spaced to the left of the left-hand pressure passageway 75 and leads from said valve chamber in a direction transversely of said valve block. Similarly, a passageway 77 is spaced to the right of the right-hand pressure passageway 75 and extends from said valve chamber in parallel relation with respect to said passageway 76. Said pressure passageways are adapted to supply fluid under pressure to opposite ends of the reversing cylinders 15, 15. The valve piston 65 has three spaced lands 80, 81 and 82, the outer lands 80 and 82 serving to control the passage of fluid under pressure from the pressure passageways 75, 75 to pressure passageways 76 and 77, respectively, and the release of fluid to the inside of the casing 13.

The block 71 has a roller 85 journaled thereon on a vertical shaft 86. Said roller engages the face of the cam 22 and serves to move the valve piston 65 to the right upon rotatable movement of said cam in a clockwise direction from a neutral position indicated by reference character 87, and to permit the spring 70 to move said valve piston to the left upon rotatable movement of said cam in a counterclockwise direction from the neutral position indicated by reference character 87.

Figure 4:
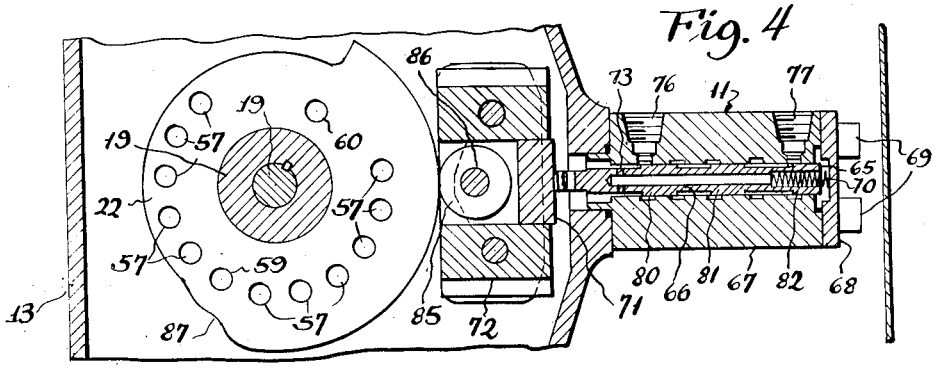
Figure 4 is a sectional view taken along the same lines as Figure 3 but showing the reversing valve in an opposite operative position from that shown in Figure 3.
Figure 6:
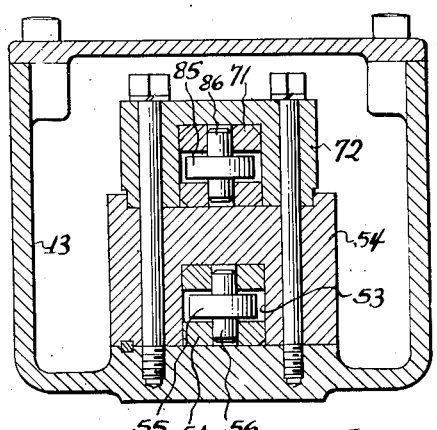
Figure 6 is an enlarged transverse sectional view taken substantially along line 6—6 of Figure 2.
Figure 5:
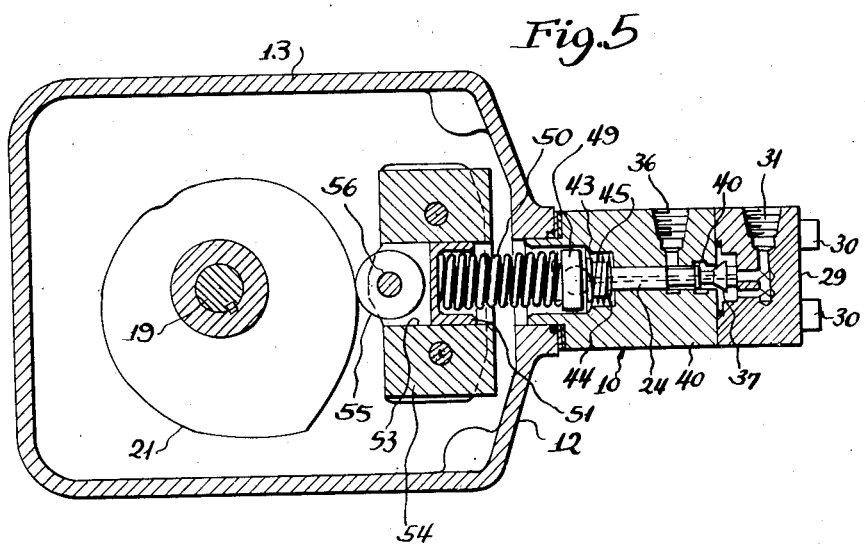
Figure 5 is a sectional view taken substantially along line 5—5 of Figure 2.
Figure 7:
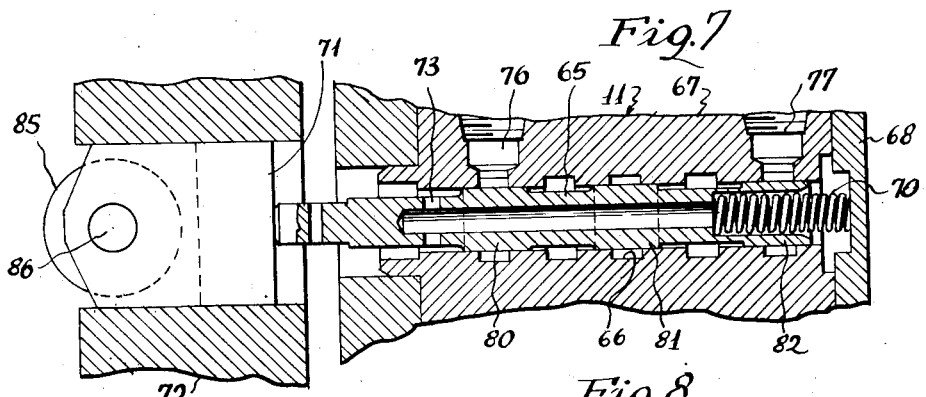
Figure 7 is an enlarged horizontal sectional view showing certain details of the reversing valve.
Figure 8:
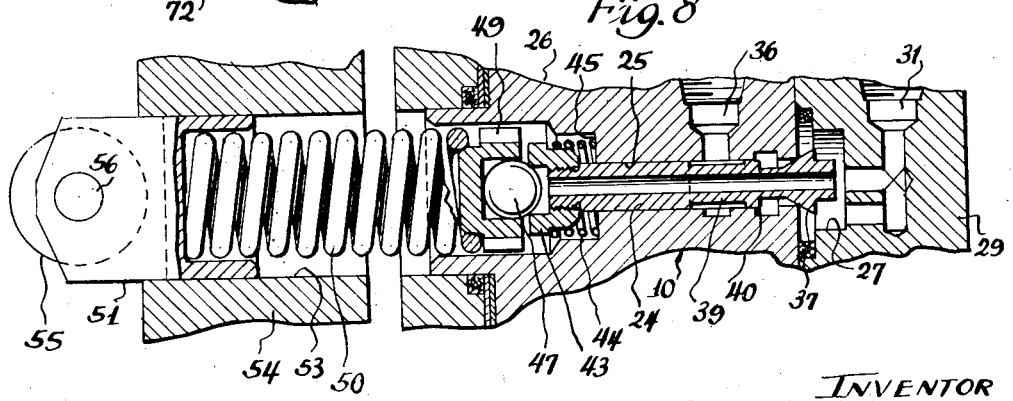
Figure 8 is an enlarged horizontal sectional view showing certain details of the variable pressure control valve.
Figure 9:
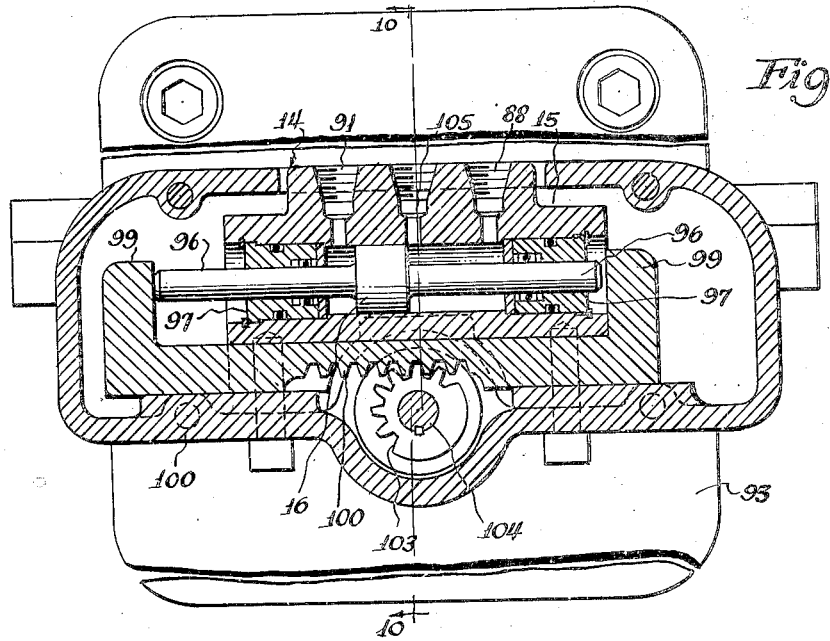
Figure 9 is a plan view of a controller for controlling reversal of a motor of the locomotive, showing the hydraulic operating means therefor in substantially horizontal section.
Figure 10:
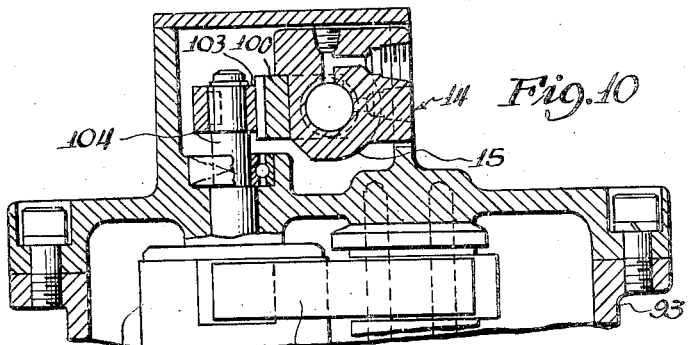
Figure 10 is a fragmentary transverse sectional view taken substantially along line 10—10 of Figure 9.

Upon movement of the valve piston 65 to the right, effected by rotatable movement of the cam 22 in a clockwise direction from the neutral position 87, fluid under pressure will pass through the right-hand pressure passageway 75, to and through the pressure passageway 77 (see Figure 4). It will then pass through a pipe 88 and a branch pipe 89 to the right-hand ends of the reversing cylinders 15, 15, to move the pistons 16, 16 within said cylinders to the left (see Figure 11). When said piston valve is in this position fluid will be released from the left-hand ends of the pistons 16, 16 and reversing cylinders 15, 15 through a pipe 91 and a branch pipe 92. Said pipe 91 is connected with the pressure passageway 76, and fluid is released from said passageway past the land 80 into the hollow valve casing 13.

When the cam 22 is moved in a counterclockwise direction from the neutral position indicated by reference character 87, the spring 70 will move the valve piston 65 to the left. Fluid under pressure will pass through the left-hand pressure passageway 75 in the space between the lands 80 and 81, to and through the pressure passageway 76, and through the pipes 91 and 92 to the left-hand ends of the reversing cylinders 15, 15, to move the pistons 16, 16 to the right. When said valve piston is in this position, fluid will be released from the pressure passageway 76 past the land 82 and through the hollow inside of said valve piston and cross drill 73.

Thus when the control handle 20 is turned in one direction from a neutral position in a direction to accelerate the locomotive motors, the piston 16 of the reversing cylinder 15 will move in one direction, and when said control handle is turned in an opposite direction from a neutral position to accelerate the locomotive motors, said piston will be moved in an opposite direction along said reversing cylinder, to control the direction of rotation of the locomotive motors merely by turning the control handle 20 in the desired direction from a neutral position.

The reversing cylinder 15 is mounted on the top of a casing 93 for the reverse drum 17. Said reverse drum is of a well known form engaged by contact fingers 95, for reversing the direction of rotation of its associated motor in the usual manner, and is no part of my present invention so is not herein shown or described in detail. The piston 16 is herein shown as having piston rods 96, 96 of equal lengths extending from its opposite sides and guided in packing glands 97, 97 closing opposite ends of said reversing cylinder. The ends of said piston rods have engagement with the laterally spaced ends 99, 99 of a rack 100, which ends extend inwardly along opposite ends of said cylinder. Said rack is guided in a side wall of the cylinder 15 and in a frame 101 formed integral with the top cover for the casing 93. Said rack is herein shown as meshing with a segment of a pinion 103 secured to the upper end of a shaft 104 for said reverse drum, for turning said reverse drum into a forward or reverse position upon rectilinear movement of said rack in an obvious manner.

A pressure passageway 105 leads from one reversing cylinder 15 intermediate its ends. The pipe 35 connects said pressure passageway with the pressure passageway 36 of the valve 10, for supplying fluid under a constant pressure thereto when the reverse drum 17 is in either a forward or a reverse position. As said drum passes from a forward to reverse position, the piston 16 will close said pressure passageway 105 and prevent fluid from being supplied to said valve 10. The controller thus cannot be operated except when said reverse drum is in either of its two operative positions.

The pressure passageway 105 on the other reversing cylinder 15 is connected with the two distributor valves 18, 18 through a pipe 106 and the branch pipe 107, to supply fluid under pressure to successively operate the contactors for starting the locomotive motors, and is also closed by the piston 16 except when said piston is in either an extreme forward or an extreme reverse position.

The pistons 16, 16 and the pressure passageways 105, 105 and the fluid connections therefrom to said variable pressure control valve and distributor valves, thus serve as hydraulic interlocks to prevent operation of the locomotive motors except when the reverse drum 17 is in either an extreme forward or an extreme reverse position.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a fluid operated controller particularly adapted to control operation of an electric motor or the like, a fluid operated reversing device to reverse the direction of rotation of said motor, a variable pressure control valve for supplying fluid at progressively increasing and decreasing pressures to control starting and stopping of said motor, a reversing valve for operating said reversing device, a single control handle for controlling operation of said variable pressure control valve and said reversing valve, and a cam operatively connected with said reversing valve and operated by said control handle and so constructed and arranged as to position said reversing valve to supply fluid under pressure to move said reversing device into one position and cause said motor to operate in one direction when said control handle is moved in one direction from an off or neutral position, to accelerate said motor, and to position said reversing valve to supply fluid under pressure to move said reversing device into another position and cause said motor to operate in an opposite direction when said control handle is moved in an opposite direction from an off or neutral position, to accelerate said motor.

2. In a fluid operated controller particularly adapted to control operation of an electric motor or the like, a fluid operated reversing device to reverse the direction of rotation of said motor, a variable pressure control valve for supplying fluid at progressively increasing and decreasing pressures to control the starting and stopping of said motor, a reversing valve to operate said reversing device, a fluid connection to said reversing valve to supply fluid under pressure thereto, fluid connections from said reversing valve to said reversing device, a fluid connection from said reversing device to said variable pressure control valve to supply fluid under pressure thereto when said reversing device is in position to cause said motor to operate in either a forward or reverse direction, and to cut off the flow of fluid under pressure thereto when said reversing device is changing from a forward to a reverse position to prevent operation of said motor until said reversing device is in a forward or reverse position, a single control handle operable to control operation of said variable pressure control valve and said reversing valve, and a cam rotatably moved by said control handle and having operative connection with said reverse valve, to move said reverse valve to positions to move said reversing device into one position to cause said motor to operate in one direction when said control handle is moved in one direction from an off or neutral position on said cam, to accelerate said motor, and to position said reversing valve to supply fluid under pressure to move said reversing device into another position and cause said motor to operate in an opposite direction when said control handle is moved in an opposite direction from an off or neutral position on said cam, to accelerate said motor.

3. In a fluid operated controller particularly adapted to control operation of an electric motor or the like, a fluid operated reversing device to reverse the direction of rotation of said motor, a variable pressure control valve for supplying fluid at progressively increasing and decreasing pressures to control starting and stopping of said motor, a reversing valve for operating said reversing device, a single control handle for operating said valves, two spaced cams rotatably moved by said control handle, one of said cams having operative connection with said reversing valve and the other of said cams having operative connection with said variable pressure control valve, and said cams being so constructed and arranged as to simultaneously operate said two valves and to move said reversing valve to a position to supply fluid under pressure to said reversing device to move said reversing device into position to cause said motor to operate in one direction when said control handle is moved in one direction from an off or neutral position, to accelerate said motor, and to move said reversing valve to a position to supply fluid under pressure to said reversing device to move said reversing device into position to cause said motor to operate in an opposite direction when said control handle is turned in an opposite direction from an off or neutral position, to accelerate said motor.

4. In a fluid operated controller particularly adapted to control operation of an electric motor or the like, a fluid operated reversing device to reverse the direction of rotation of said motor, a variable pressure control valve for supplying fluid at progressively increasing and decreasing pressures to control starting and stopping of said motor, a reversing valve to operate said reversing device, a fluid connection to said reversing valve to supply fluid under pressure thereto, fluid pressure connections from said reversing valve to said reversing device, a single control handle for operating said valves, two cams rotatably moved by said control handle, one of said cams having operative connection with said reversing valve and the other of said cams having operative connection with said variable pressure control valve, said cams being so constructed and arranged as to simultaneously operate said two valves and to move said reversing valve to a position to supply fluid under pressure to said reversing device to move said reversing device into position to cause said motor to operate in one direction when said control handle is moved in one direction from an off or neutral position, to accelerate said motor, and to move said reversing valve to a position to supply fluid under pressure to said reversing device to move said reversing device into position to cause said motor to operate in an opposite direction when said control handle is turned in an opposite direction from an off or neutral position, to accelerate said motor, and a fluid connection from said reversing device to said variable pressure control valve arranged to supply fluid under pressure thereto when said reversing device is in position to cause said motor to operate in either a forward or reverse direction, and to cut off the flow of fluid under pressure to said variable pressure control valve when said reversing device is changing from a forward to a reverse position, to prevent operation of said motor until said reversing device has moved to a forward or reverse position.

JOSEPH J. SLOMER.

REFERENCES CITED

The following references are of record in the file of this patent:

UNITED STATES PATENTS

| Number | Name | Date |
| --- | --- | --- |
| 797,774 | Lord | Aug. 22, 1905 |
| 809,707 | Linn | Jan. 9, 1906 |
| 2,106,474 | Baughman | Jan. 25, 1938 |
| 2,417,524 | Slomer | Mar. 18, 1947 |